United States Patent
Grisey et al.

(10) Patent No.: US 10,988,114 B2
(45) Date of Patent: Apr. 27, 2021

(54) METHOD FOR ACTIVATING AT LEAST ONE FUNCTION OF A PIECE OF EQUIPMENT OF A VEHICLE

(71) Applicants: Continental Automotive France, Toulouse (FR); Continental Automotive GmbH, Hannover (DE)

(72) Inventors: Christophe Grisey, Colomiers (FR); Laurent Julien, Tournefeuille (FR); Xavier Bressan, Pompertuzat (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/761,951

(22) PCT Filed: Nov. 29, 2018

(86) PCT No.: PCT/FR2018/053037
§ 371 (c)(1),
(2) Date: May 6, 2020

(87) PCT Pub. No.: WO2019/106300
PCT Pub. Date: Jun. 6, 2019

(65) Prior Publication Data
US 2020/0377056 A1 Dec. 3, 2020

(30) Foreign Application Priority Data
Nov. 30, 2017 (FR) ........................ 1761401

(51) Int. Cl.
*B60R 25/24* (2013.01)
*H04B 17/318* (2015.01)
*B60R 25/01* (2013.01)

(52) U.S. Cl.
CPC .............. *B60R 25/24* (2013.01); *B60R 25/01* (2013.01); *H04B 17/318* (2015.01)

(58) Field of Classification Search
CPC ........ B60R 25/24; B60R 25/01; H04B 17/318
See application file for complete search history.

(56) References Cited

U.S. PATENT DOCUMENTS

2015/0256669 A1* 9/2015 James ................ H04W 4/42
455/418
2016/0159321 A1* 6/2016 Lagabe ............... B60R 25/245
701/2

(Continued)

FOREIGN PATENT DOCUMENTS

FR 3007874 A1 1/2015

OTHER PUBLICATIONS

English Translation of the Written Opinion for international Application No. PCT/FR2018/053037, dated Mar. 26, 2019, 6 pages.

(Continued)

*Primary Examiner* — Thomas D Alunkal
(74) *Attorney, Agent, or Firm* — RatnerPrestia

(57) ABSTRACT

A method for the activation by a user with a portable device of at least one function of a piece of motor vehicle equipment. The vehicle having a plurality of predefined areas (around and/or inside the vehicle) and including a plurality of pieces of equipment, each capable of implementing at least one function, and a management system for controlling the pieces of equipment. The method includes the user performing a predefined movement of the device in at least one predefined vehicle area, the management system determining the movement performed by the user with the device and the area or areas in which the movement is performed, associating the movement performed and the area or areas in which the movement is performed with at least one function of at least one of the vehicle's pieces of equipment, and activation by the management system of the at least one associated function.

10 Claims, 3 Drawing Sheets

(56) References Cited

U.S. PATENT DOCUMENTS

| | | | | |
|---|---|---|---|---|
| 2016/0170493 | A1* | 6/2016 | Park | G06K 9/00355 |
| | | | | 345/156 |
| 2017/0080332 | A1* | 3/2017 | Poisner | A63F 13/211 |
| 2017/0147074 | A1* | 5/2017 | Buttolo | B60N 2/0244 |
| 2017/0160786 | A1* | 6/2017 | Ji | G07C 9/00309 |
| 2018/0070291 | A1* | 3/2018 | Breaux | H04W 84/005 |

OTHER PUBLICATIONS

International Search Report and Written Opinion for International Application No. PCT/FR2018/053037, with partial English translation, dated Mar. 26, 2019, 9 pages.

International Search Report and Written Opinion for International Application No. PCT/FR2018/053037, dated Mar. 26, 2019, 13 pages (French).

* cited by examiner

METHOD FOR ACTIVATING AT LEAST ONE FUNCTION OF A PIECE OF EQUIPMENT OF A VEHICLE

CROSS REFERENCE TO RELATED APPLICATIONS

This application is the U.S. National Phase Application of PCT International Application No. PCT/FR2018/053037, filed Nov. 29, 2018, which claims priority to French Patent Application No. 1761401, filed Nov. 30, 2017, the contents of such applications being incorporated by reference herein.

FIELD OF THE INVENTION

The invention relates to the field of remote activation of functions of a motor vehicle, and relates more particularly to a method for activating at least one function of a piece of equipment of a motor vehicle.

The invention is intended, in particular, to enable a plurality of functions of pieces of equipment of the vehicle to be activated by executing predetermined movements, associated with said functions, in one or more predefined areas around the vehicle or inside the vehicle.

BACKGROUND OF THE INVENTION

At the present time, there are known ways of unlocking the openable body sections or of starting the engine of a motor vehicle by using a dedicated device such as a key, badge or smartphone. More precisely, when the user carrying the device approaches the vehicle the device initially captures a radio signal transmitted periodically by a computer of the vehicle via a transmitting antenna, and then communicates with the computer in order to authenticate itself with it so that it unlocks the openable body sections.

For the activation of various functions of the vehicle, a system for activating a plurality of functions according to the area in which the device is located is known from the document FR 3 007 874 A1, incorporated herein by reference. In this solution, the user must execute a predefined movement in a predefined area relative to the vehicle, in order to activate a specific function of the vehicle. For example, the user may execute a movement with the device when he is on the left-hand side of the vehicle, in order to unlock an openable body section located on the left-hand side of the vehicle, while the same movement performed on the right-hand side of the vehicle will allow the opening of an openable body section on the right-hand side of the vehicle.

In this solution, the movement is detected by means of a movement sensor fitted in the device. More precisely, the measurements made by the movement sensor are analyzed by the device in order to identify the movement performed by the user with said device. When the nature of the movement has been determined, the device sends a message to the vehicle to inform it of the movement performed. The vehicle then determines the area in which the device is located and triggers the associated function on the basis of said area and the movement performed.

However, this solution has a number of drawbacks. In the first place, the use of a movement sensor fitted in the device and a detection unit for determining the movements made by the device, also fitted in the device, makes the device complicated and expensive. Moreover, the user must learn the areas and movements predefined in the factory by the manufacturer, in order to be able to activate the various functions according to the area in which the device is located, which may be troublesome. Similarly, the predefined areas are not necessarily related geographically with the functions to be activated, and this may appear counter-intuitive to the user. Finally, the system may fail when a predefined movement is performed by the device between two adjacent areas, which is a further drawback.

Consequently there is a need for a simple, reliable and effective solution for activating various functions of a motor vehicle while overcoming at least some of the aforementioned drawbacks.

SUMMARY OF THE INVENTION

To this end, an aspect of the invention proposes a method for the activation by a user of at least one function of at least one piece of equipment of a motor vehicle by means of a portable device, said vehicle being characterized by a plurality of predefined areas around and/or inside said vehicle and comprising a plurality of pieces of equipment, each capable of implementing at least one function, and a management system capable of controlling said plurality of pieces of equipment, said method comprising the steps of:
definition of at least one movement of the device by the user,
periodic transmission, by the management system, of signals to the device,
performance, by the user, of the predefined movement of the device in at least one predefined area of the vehicle,
measurement by the device, during the user's performance of the predefined movement of the device, of the power of each signal transmitted periodically by the management system,
sending of the measured values to the management system, using the device,
determination, by the management system, of the movement performed by the user with the device, and of the area or areas in which said movement is performed, on the basis of the power measurements received,
association, by the management system, of the movement performed, and of the area or areas in which said movement is performed, with at least one function of at least one piece of equipment of the vehicle, and
activation, by the management system, of the at least one associated function.

Advantageously, at least one predefined area comprising at least one piece of equipment of the vehicle, the activation by the management system of the associated function is performed on the piece of equipment associated with the determined movement and located in the area in which the predefined movement has taken place.

Thus a movement of the device may be initiated in one area and terminated in another area, thereby multiplying the number of functions that can be activated, relative to the case in which each movement is possible only the same area for activating a function.

In one embodiment, each predefined area comprises at least one piece of equipment of the vehicle.

Preferably, each predefined area is centered on one piece of equipment of the vehicle.

In one embodiment, the predefined areas are separate.

Also advantageously, the activation by the management system of the associated function is performed on the piece of equipment associated with the determined movement and located in the predefined area in which the predefined movement has taken place.

According to one embodiment, the movement defined by the user is defined by using the device, enabling the user to parameterize the system easily and precisely.

Advantageously, the method also comprises a preliminary step of detecting and authenticating the device.

An aspect of the invention also covers a motor vehicle, characterized by a plurality of predefined areas around and/or inside said vehicle and comprising a plurality of pieces of equipment, each capable of implementing at least one function, and a management system capable of controlling said plurality of pieces of equipment, said management system being configured for:

periodically transmitting signals to the device, determining a movement performed by a user with a portable device in at least one predefined area of the vehicle, together with the area or areas in which said movement is performed, on the basis of power values received from the device, said power values having been previously measured by the device on signals transmitted by a management system and sent by said device to the management system, associating a movement of the device and the area or areas in which said movement has been performed with at least one function of at least one piece of equipment of the vehicle, and activating said at least one associated function.

Advantageously, the vehicle has at least one predefined area comprising at least one piece of equipment of the vehicle, the management system being configured for activating the associated function of the piece of equipment associated with the determined movement and located in the predefined area in which the determined movement has taken place.

In one embodiment, the vehicle has at least one predefined area comprising at least one piece of equipment of the vehicle, the management system being configured for activating the associated function of the piece of equipment associated with the determined movement and located in the predefined area in which the end of the predetermined movement has taken place.

In one embodiment, each predefined area comprises at least one piece of equipment of the vehicle.

Advantageously, the management system is configured for storing and detecting the movements determined by the user, preferably by means of the device.

Preferably, the management system is configured for displaying a list of functions associated with the piece or pieces of equipment of the area in which the device is located.

Finally, an aspect of the invention also relates to a system for the activation by a user, by means of a portable device, of at least one function of a piece of equipment of a motor vehicle, said system being remarkable in that it comprises a motor vehicle as described above and a portable device capable of communicating with the management system of said vehicle.

Preferably, the vehicle is configured for detecting and authenticating the device.

BRIEF DESCRIPTION OF THE DRAWINGS

Other characteristics and advantages of aspects of the invention will become apparent from the following description, provided with reference to the appended figures which are given by way of non-limiting example and in which identical reference signs are given to similar objects.

DETAILED DESCRIPTION OF THE PREFERRED EMBODIMENTS

Figure 1:
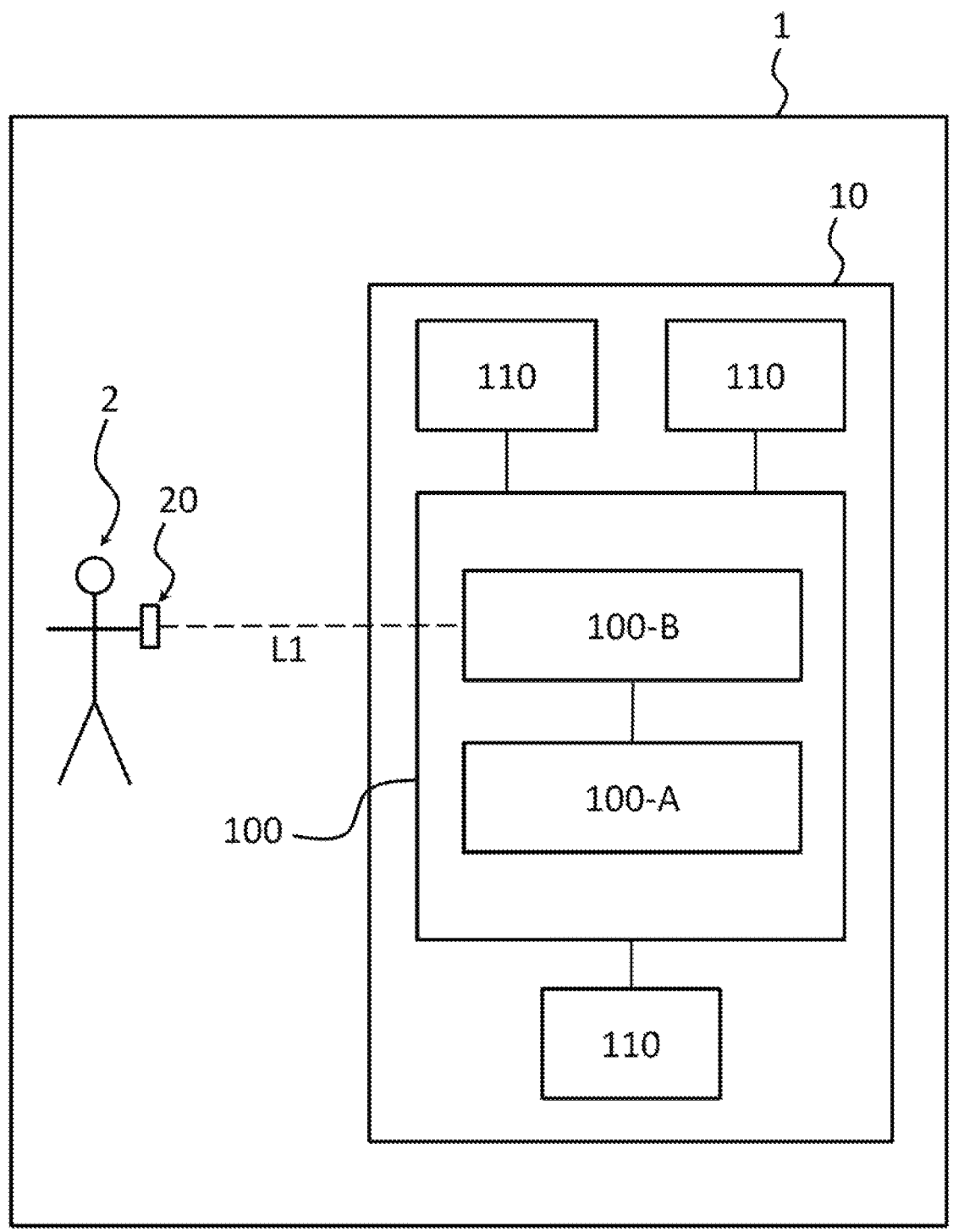
FIG. 1 shows schematically one embodiment of the system according an aspect of to the invention.

An example of a system 1 according to an aspect of the invention is shown schematically in FIG. 1.

The system 1 comprises a motor vehicle 10 and a portable device 20 and allows the activation by a user 2 of at least one function of a piece of equipment 110 of the vehicle 10 by means of the device 20.

In this example, the vehicle 10 comprises a management system 100 and a plurality of pieces of equipment 110. However, it should be noted that, in another embodiment, the vehicle 10 could comprise a single piece of equipment, two pieces of equipment or more than three pieces of equipment. The term "piece of equipment" is taken to mean an element of the vehicle that may be controlled by the management system 100, such as, for example, an openable body section (door, trunk, roof, etc.), a rear-view mirror, an electrically adjustable seat, the air conditioning system of the vehicle, a touch screen, etc.

The management system 100 comprises a computer 100-A, of the type known as an ECU, for "Electronic Control Unit" in English, and a communication module 100-B. It should be noted that, in another embodiment, the management system 100 could comprise more than one computer 100-A and more than one communication module 100-B.

The computer 100-A is configured for detecting and authenticating the device 20. To this end, the computer 100-A is configured for periodically transmitting a broadcast signal in the environment of the vehicle 10. The device 20 is configured for receiving this broadcast signal and transmitting in return an authentication signal comprising an identifier of the device 20. When this authentication signal is received by the computer 100-A, the computer 100-A is configured for authenticating the device 20 on the basis of its identifier, in order to authorize the device 20 to launch the activation of the functions of the pieces of equipment 110 of the vehicle 10 as described below.

Figure 2:
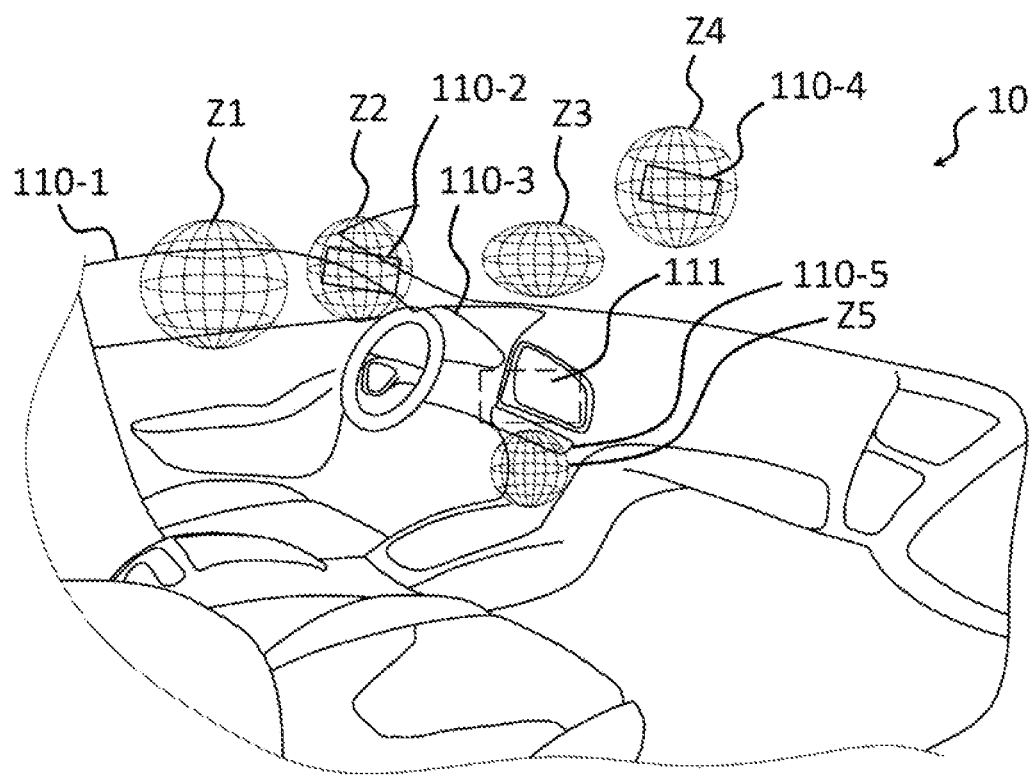
FIG. 2 shows an example of predefined areas around and inside a vehicle.
Figure 3:
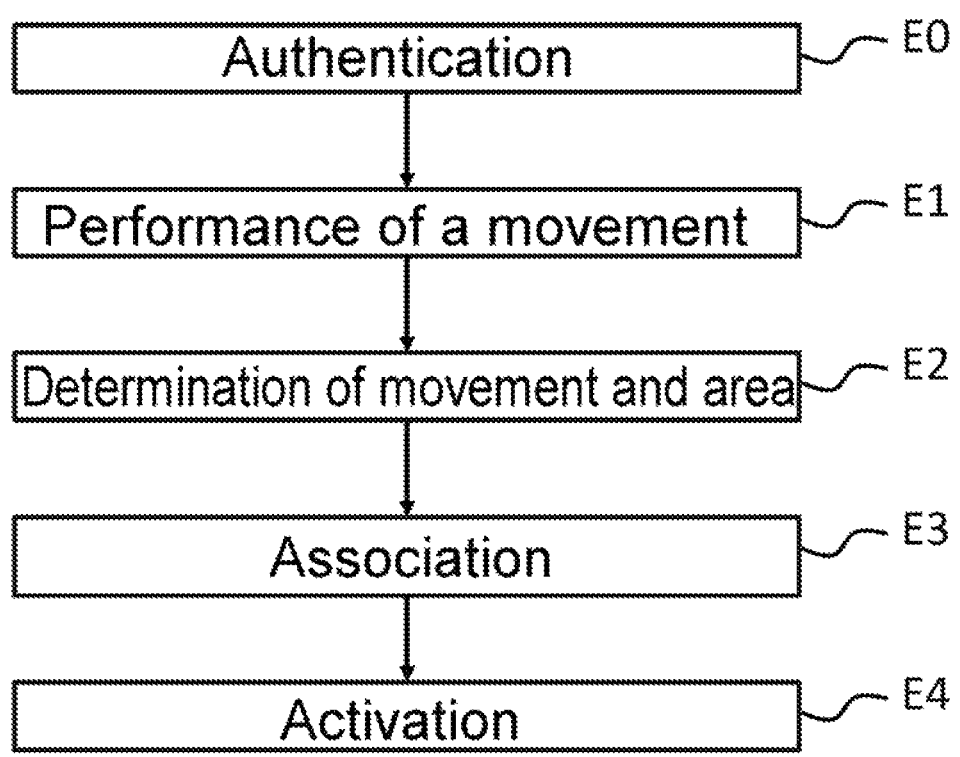
FIG. 3 shows schematically an embodiment of the method according to an aspect of the invention.

The vehicle 10 is characterized by a plurality of predefined areas, which may be located around and/or inside the vehicle 10. By way of example, a vehicle characterized by five areas Z1, Z2, Z3, Z4, Z5 is shown in FIG. 2. Evidently, however, in another example the vehicle could be characterized by more or fewer than five areas Z1, Z2, Z3, Z4, Z5, without thereby limiting the scope of the present invention.

Each area Z1, Z2, Z3, Z4, Z5 may be predefined in the factory, or by the user 2 using the management system 100. In the latter case, for example, the user 2 may select a mode called "movement acquisition" from a menu displayed on a screen 111 of the vehicle 10, and may then select, for example, a type of desired volume for the area to be determined (sphere, ellipsoid, block, etc.). The user 2 may then place the device 20 in the center of the area that he wishes to determine and then press a key (not shown) on the device 20 to confirm. The user 2 may then define the volume as he wishes by keeping the key depressed while moving the device 20, the position of which is determined at each instant by the computer 100-A as described below, to the boundaries of the desired volume, before releasing the key. The boundaries of the volume may, for example, be the radius in the case of a sphere, the length of the semi-axes of an ellipsoid, a half-diagonal in the case of a block, etc.

Each predefined area Z1, Z2, Z3, Z4, Z5 is thus associated with at least one piece of equipment 110-1, 110-2, 110-3, 110-4, 110-5 which is or is not located in the area Z1, Z2, Z3, Z4, Z5.

Preferably, each predefined area Z1, Z2, Z3, Z4, Z5, Z6 comprises at least one piece of equipment; that is to say, at least one piece of equipment 110-1, 110-2, 110-3, 110-4, 110-5 is located in a space defining said predefined area Z1, Z2, Z3, Z4, Z5, Z6. Each piece of equipment 110-1, 110-2, 110-3, 110-4, 110-5 is configured for implementing one or more functions. For example, a rear-view mirror may be configured for being folded or deployed. An opening roof may be configured for being open or closed. Openable body sections such as a door, a trunk or a hood may be configured for being locked or unlocked.

With reference to FIG. 2, the area Z1 is a sphere located at the left-hand front window 110-1 of the driver's seat. This area Z1 may, for example, be associated with two movements of the device 20 for controlling the opening or closing of said window 110-1. The area Z2 is a sphere located at the left-hand front rear-view mirror 110-2 (on the driver's side). This area Z2 may, for example, be associated with movements of the device 20 for adjusting the mirror (not shown) of said rear-view mirror 110-2, or for folding or deploying it. The area Z3 is an ellipsoid located above the dashboard 110-3 of the vehicle 10. This area Z3 may, for example, be associated with movements for controlling the elements of said dashboard 110-3 (for example, for resetting the number of kilometres to zero before a journey, or for accessing menus for the elements of the dashboard 110-3). The area Z4 is a sphere located at the interior rear-view mirror 110-4 of the vehicle 10. This area Z4 may, for example, be associated with movements of the device 20 for adjusting said interior rear-view mirror 110-4. The area Z5 is a sphere located at the multimedia interface 110-5 of the vehicle 10. This area Z5 may, for example, be associated with movements of the device 20 for controlling the multimedia interface 110-5, for example for selecting radio frequencies, for controlling a driving assistance module (not shown) of the vehicle 10, etc.

The implementation of the functions of the pieces of equipment 110-1, 110-2, 110-3, 110-4, 110-5 is controlled by the computer 100-A via a communications network (not shown) on board the vehicle 10.

The computer 100-A is configured for determining a movement performed by the user 2 with the portable device 20 in one or more of the predefined areas Z1, Z2, Z3, Z4, Z5 of the vehicle 10, as well as for determining the area or areas Z1, Z2, Z3, Z4, Z5 in which said movement is performed. To this end, the computer 100-A is configured for transmitting periodically, for example every 300 ms, signals for detecting movement in the environment of the vehicle 10, once the phase of authentication of the device 20 has been performed (that is to say, once the device 20 has been authenticated).

The computer 100-A is configured for associating a movement of the device 20, and one or more of the areas in which said movement has been performed, with at least one function of at least one piece of equipment of the vehicle 10, preferably (but not necessarily) located in said determined area or in one of said determined areas.

The computer 100-A is configured for activating one or more functions associated with movement performed, according to the area or areas Z1, Z2, Z3, Z4, Z5 in which said movement has been performed.

Preferably, the computer 100-A is configured for activating the associated function of the piece of equipment 110-1, 110-2, 110-3, 110-4, 110-5 associated with the determined movement and located in the determined area Z1, Z2, Z3, Z4, Z5 in which the determined movement has taken place.

The computer 100-A may be configured for activating the associated function of the piece of equipment 110-1, 110-2, 110-3, 110-4, 110-5 associated with the determined movement and located in the predefined area Z1, Z2, Z3, Z4, Z5 in which the start of the predetermined movement has taken place.

The computer 100-A may be configured for activating the associated function of the piece of equipment 110-1, 110-2, 110-3, 110-4, 110-5 associated with the determined movement and located in the predefined area Z1, Z2, Z3, Z4, Z5 in which the end of the predetermined movement has taken place.

The device 20 is portable, and may for example take the form of a key, a badge, a smart watch, or a smartphone.

The device 20 is capable of communicating with the communication module 100-B of the management system 100 of the vehicle 10 over a wireless communication link L1 (FIG. 1), for example one of the LF ("Low Frequency"), RF ("Radio Frequency"), or Bluetooth® type, or any suitable link. Such communication may advantageously be provided with the aid of an existing or adapted communications protocol.

The activation of the functions of the pieces of equipment 110-1, 110-2, 110-3, 110-4, 110-5 is performed by the user 2, by moving the device 20 in predefined movements.

Some or all of the movements may be predefined in the factory before the marketing of the vehicle 10, or may be defined by the user 2. More precisely, the computer 100-A may advantageously comprise a programming function enabling the user 2 to configure, for each area Z1, Z2, Z3, Z4, Z5, at least one movement for controlling at least one piece of equipment 110-1, 110-2, 110-3, 110-4, 110-5 at any time during the life of the vehicle 10. The movement may be defined by the user 2 by means of the device 20, for example by executing the movement with the device 20 during a learning phase of the computer 100-A.

The device 20 is configured for receiving, when it is within the coverage of the communication module 100-B, the movement detection signals and transmitting in return a response signal, for example a reflected signal.

It is assumed that the movements for activating the functions of the pieces of equipment 110-1, 110-2, 110-3, 110-4, 110-5 have been determined in advance, either in the factory or by the user in a parameterization phase.

In a preliminary step E0, the device 20 is initially authenticated by the management system 100. More precisely, when the user 2 approaches the vehicle 10 and is within the coverage of the communication module 100-B, the device 20 detects the periodic movement detection signals transmitted by the communication module 100-B and transmits in return a response signal comprising its identifier. The computer 100-A then performs the authentication of the device 20; that is to say, it identifies the device 20 on the basis of its identifier and authorizes the device to communicate with it to launch functions of the vehicle.

In a step E1, the user 2 positions himself with the device 20 in a predefined area Z1, Z2, Z3, Z4, Z5 of the vehicle 10 and executes a predetermined movement.

The management system 100 then determines, in a step E2, the movement performed by the user 2 with the device 20 and the area or areas Z1, Z2, Z3, Z4, Z5 in which said movement was performed. To this end, for example, the computer 100-A transmits a signal called a "reference" signal, of the LF ("Low Frequency") frame type for example, during a time interval, for example a periodic interval, for a given function, for example for controlling the opening roof, unlocking the openable body sections, or the like, using a predetermined set of antennas (not shown) of the vehicle 10 linked to said given function. When the device 20 receives this reference signal, it measures the power of said received reference signal and determines a value of an indicator of the strength of the received signal (RSSI or "Received Signal Strength Indication" in English), in a known way. The device 20 then sends a message to the computer 100-A in a signal called a "response" signal, of the RF ("Radio Frequency") frame type for example, comprising the RSSI value measured for the reference signal received. On receiving this RSSI value, the computer 100-A compares it with one or more predetermined RSSI values for one or more areas Z1, Z2, Z3, Z4, Z5 associated with the function and stored in a storage area of the computer 100-A or of the vehicle 10, in order to determine the relative position of the device 20 with respect to the area or areas Z1, Z2, Z3, Z4, Z5 associated with the given function. In fact, each RSSI measurement is an indication of the position of the device 20 with respect to the predetermined set of antennas. Therefore, the set RSSI values received in response to the same reference signal for a predetermined set of antennas may be used to deduce precisely the position of the device 20 with respect to said predetermined set of antennas, in a known way.

The management system 100 then associates, in a step E3, the movement performed, and the area or areas Z1, Z2, Z3, Z4, Z5 in which said movement was performed, with a function of a piece of equipment 110-1, 110-2, 110-3, 110-4, 110-5 of the vehicle 10, and then activates said associated function in a step E4.

For example, the user 2 may position the device 20 in the area Z1 and execute a vertical downward movement to lower the window 110-1 of the driver's door, or a vertical upward movement to raise the window 110-1 of the driver's door.

Similarly, the user 2 may position the device 20 in the area Z2 and execute a horizontal movement from left to right to make the mirror of the driver's rear-view mirror conductive 110-2 pivot to the right, or a horizontal movement from right to left to make the mirror of the driver's rear-view mirror 110-2 pivot to the left.

The user 2 may also position the device 20 in the area Z3 and execute, in a vertical plane, a circular movement in the clockwise direction (dextrorsum) which activates the ignition (activation of the dashboard 110-3, engine ready for starting). Also in the area Z3, the user 2 may then, for example, execute a horizontal oscillatory movement to activate the air conditioning system.

The user 2 may position the device 20 in the area Z4 and execute a horizontal movement from left to right to make the mirror of the rear-view mirror in the passenger compartment 110-4 pivot to the right, or a horizontal movement from right to left to make the mirror of the rear-view mirror in the passenger compartment 110-4 pivot to the left.

The user 2 may position the device 20 in the area Z5 and execute a horizontal movement from left to right to scan a radio frequency band of the multimedia system.

It should be noted that, in these examples, the piece of equipment 110-1, 110-2, 110-3, 110-4, 110-5 is located in the area Z1, Z2, Z3, Z4, Z5 from which it can be activated. However, the piece of equipment 110-1, 110-2, 110-3, 110-4, 110-5 could equally well be located outside the area Z1, Z2, Z3, Z4, Z5 in which it is located. For example, a predetermined movement performed in the area Z4 could be used to open or close the opening roof (not shown) of the vehicle 10, or to open or close the trunk of the vehicle 10.

In another example, a movement may be associated with a number of areas Z1, Z2, Z3, Z4, Z5. For example, the user 2 could start a movement in the area Z1 and end it in the area Z3. In this case, the management system 100 detects this movement and, if appropriate, launches the associated function, for example the unlocking of the two left-hand doors of the vehicle 10.

Similarly, a movement may be predetermined for activating a function of a piece of equipment 110-1, 110-2, 110-3, 110-4, 110-5 when it is started in one of the areas Z1, Z2, Z3, Z4, Z5 and completed outside the area Z1, Z2, Z3, Z4, Z5, the exact place where said movement is completed being unimportant.

Similarly, a movement may be predetermined for activating a function of a piece of equipment 110-1, 110-2, 110-3, 110-4, 110-5 when it is completed in one of the areas Z1, Z2, Z3, Z4, Z5, the place where said movement started being unimportant.

According to an aspect of the invention, the device 20 may be used advantageously in one or more of the areas Z1, Z2, Z3, Z4, Z5 as a 3D pointer or mouse, notably for pointing to elements appearing on a screen of the vehicle, on a head-up display, or on a hologram. The device 20 may also be used advantageously for recording a security tracing configuration for locking access to one of the functions of the vehicle 10.

An aspect of the invention therefore facilitates the activation of a wide range of functions of pieces of equipment 110-1, 110-2, 110-3, 110-4, 110-5 of the vehicle 10 by means of movements which may advantageously be predefined by the user 2, on the basis of one or more areas Z1, Z2, Z3, Z4, Z5 associated with the vehicle 10.

The invention claimed is:

1. A method for the activation by a user of at least one function of at least one piece of equipment of a motor vehicle by means of a portable device, said vehicle being characterized by a plurality of predefined areas around and/or inside said vehicle and comprising a plurality of pieces of equipment, each capable of implementing at least one function, and a management system capable of controlling said plurality of pieces of equipment, said method comprising:
    definition of at least one movement of the device by the user,
    periodic transmission by the management system, of signals to the device,
    performance by the user of the predefined movement of the device in at least one predefined area of the vehicle,
    measurement by the device, during the performance of the predefined movement of the device by the user, of the power of each signal transmitted periodically by the management system,
    sending, by the device, of the measured values to the management system,
    determination, by the management system, of the movement performed by the user with the device, and of the area or areas in which said movement is performed, on the basis of the power measurements received,
    association, by the management system, of the movement performed, and of the area or areas in which said movement is performed, with at least one function of at least one piece of equipment of the vehicle, and activation, by the management system, of the at least one associated function.

2. The method as claimed in claim 1, wherein, at least one predefined area comprising at least one piece of equipment of the vehicle, the activation by the management system of the associated function is performed on the piece of equipment associated with the determined movement and located in the predefined area in which the predefined movement has taken place.

3. The method as claimed in claim 1, wherein the activation by the management system of the associated function is performed on the piece of equipment associated with the determined movement and located in the predefined area in which the predefined movement has ended.

4. The method as claimed in claim 1, wherein the movement defined by the user is defined by using the device.

5. The method as claimed in claim 1, further comprising a preliminary step of detecting and authenticating the device.

6. A motor vehicle characterized by a plurality of predefined areas around and/or inside said vehicle and comprising a plurality of pieces of equipment, each capable of implementing at least one function, and a management system capable of controlling said plurality of pieces of equipment, said management system being configured for:
periodically transmitting signals to a portable device,
determining a movement performed by a user with the portable device in at least one predefined area of the vehicle (10), together with the area or areas in which said movement is performed, on the basis of power values received from the device, said power values having been previously measured by the device on signals transmitted by a management system and sent by said device to the management system,
associating a movement of the device and the area or areas in which said movement has been performed with at least one function of at least one piece of equipment of the vehicle, and
activating said at least one associated function.

7. The vehicle as claimed in claim 6, wherein at least one predefined area comprises at least one piece of equipment of the vehicle, the management system being configured for activating the associated function of the piece of equipment associated with the determined movement and located in the predefined area in which the determined movement has taken place.

8. The vehicle as claimed in claim 6, wherein at least one predefined area comprises at least one piece of equipment of the vehicle, the management system being configured for activating the associated function of the piece of equipment associated with the determined movement and located in the predefined area in which the end of the predetermined movement has taken place.

9. A system for the activation by a user, by a portable device, of at least one function of a piece of equipment of a motor vehicle, said system comprising a motor vehicle as claimed in claim 6 and a portable device capable of communicating with the management system of said vehicle.

10. The vehicle as claimed in claim 7, wherein at least one predefined area comprises at least one piece of equipment of the vehicle, the management system being configured for activating the associated function of the piece of equipment associated with the determined movement and located in the predefined area in which the end of the predetermined movement has taken place.

* * * * *